United States Patent
Kulal

(10) Patent No.: US 9,826,527 B2
(45) Date of Patent: Nov. 21, 2017

(54) COMPRESSED MODE INTRA/INTER CELL INTERFERENCE MITIGATION

(71) Applicant: Cisco Technology, Inc., San Jose, CA (US)

(72) Inventor: Sushanth Chandappa Kulal, Mangalore (IN)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 14/529,534

(22) Filed: Oct. 31, 2014

(65) Prior Publication Data

US 2016/0128058 A1    May 5, 2016

(51) Int. Cl.
*H04W 72/04* (2009.01)
*H04W 72/08* (2009.01)
*H04L 1/00* (2006.01)
*H04W 72/12* (2009.01)

(52) U.S. Cl.
CPC .......... *H04W 72/0446* (2013.01); *H04L 1/00* (2013.01); *H04W 72/0413* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2001/0022782 A1* | 9/2001 | Steudle | H04W 24/10 370/335 |
| 2012/0170473 A1* | 7/2012 | Das | H04W 36/0083 370/252 |
| 2014/0135029 A1* | 5/2014 | Choi | H04W 16/00 455/452.2 |
| 2014/0341192 A1* | 11/2014 | Venkob | H04L 5/001 370/336 |

* cited by examiner

*Primary Examiner* — Kevin C Harper
*Assistant Examiner* — Derrick V Rose
(74) *Attorney, Agent, or Firm* — Patterson + Sheridan, LLP

(57) ABSTRACT

This application pertains to systems, apparatus and methods for decreasing interference in wireless networks caused by User Equipments (UEs) entering compressed mode. Under certain generally accepted communication protocols, a UE can transmit at a higher power relative to normal transmissions when it enters compressed mode. These high power transmissions can cause interference both for UEs within the same cell (e.g., small cells or macrocells) as well as for UEs in neighboring cells. This interference can be minimized by using the presently disclosed systems, apparatus and methods to schedule time slots for UEs to go into compressed mode such that the distance in time between any two UEs going into compressed mode across one or more neighboring cells is maximized. By spreading out the interference effect of UEs going into compressed mode over time, overall interference in the wireless network can be decreased.

24 Claims, 10 Drawing Sheets

| Frame number | | | | | | | | | | | | | | |
|---|---|---|---|---|---|---|---|---|---|---|---|---|---|---|
| Cell A | 0 | 1 | 2 | 3 | 4 | 5 | 6 | 7 | 8 | 9 | 10 | 11 | 12 | 13 | 14 |
| Cell B | 27 | 28 | 29 | 30 | 31 | 0 | 1 | 2 | 3 | 4 | 5 | 6 | 7 | 8 | 9 |
| Cell C | 22 | 23 | 24 | 25 | 26 | 27 | 28 | 29 | 30 | 31 | 0 | 1 | 2 | 3 | 4 |

FIG. 5

COMPRESSED MODE INTRA/INTER CELL INTERFERENCE MITIGATION

FIELD OF THE DISCLOSURE

The present disclosure relates generally to systems and methods for mitigating intra-cell and/or inter-cell interference caused by UE's within cells.

BACKGROUND

In cellular telecommunications networks, user equipments (UEs) can sometimes go into "compressed mode." Compressed mode refers to a mode in which a UE and the base station to which the UE is communicating schedules brief time gaps in downlink and uplink transmissions. The purpose of these scheduled time gaps is to allow a UE to perform measurements on neighboring cells of a different frequency than its current serving cell. The UE can perform measurements on neighboring GSM, W-CDMA, or E-UTRAN cells. After the gap in the downlink and uplink transmissions is over, transmission and reception resumes.

Various methods can be used to make sure that data is not lost during these scheduled time gaps. Some UEs and base stations can use secondary scrambling codes to transmit data using an alternate channel while also performing measurements on neighboring cells. Some UEs and base stations can also use schedule data transmissions such that no data needs to be transmitted during a scheduled time gap. However, many UEs use a SF/2 method to enter compressed mode in which uplink and downlink data is "compressed" immediately before and after the scheduled time gap. Under the SF/2 method, this compression can be achieved by increasing the power level at which transmissions are transmitted. Increasing the power level of transmissions, however, can cause increased interference for UEs within the same cell or in neighboring cells.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 5 is an exemplary timing diagram showing how frame numbers between different cells can be adjusted to better align with each other, in accordance with certain embodiments.

DESCRIPTION OF EXAMPLE EMBODIMENTS

Summary of the Invention

Figure 1:
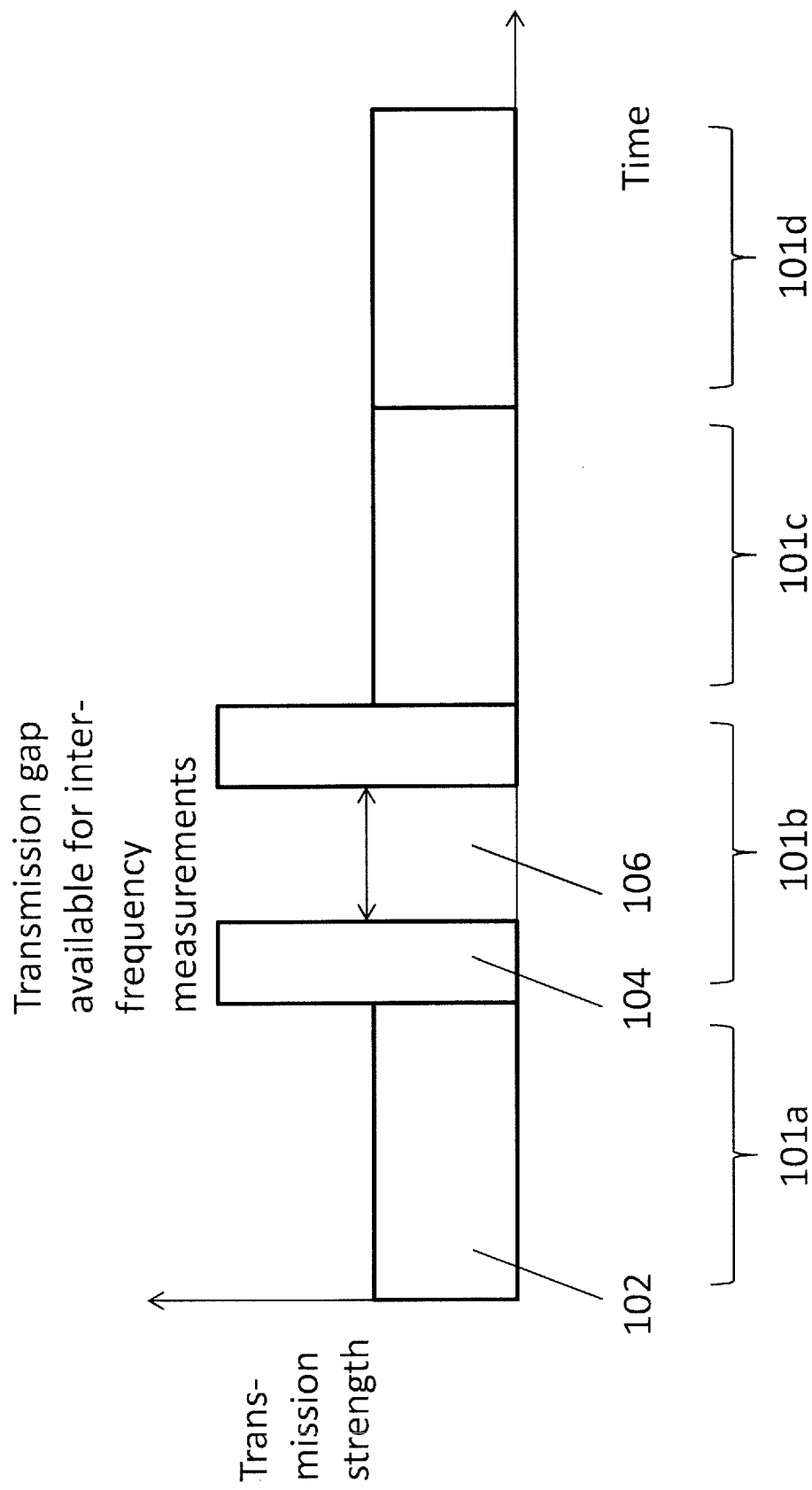
FIG. 1 is an exemplary graph of transmission strength vs. time that illustrates the operation of compressed mode, in accordance with certain embodiments.

The present disclosure is directed at systems and methods for mitigating intra-cell and/or inter-cell interference caused by UE's within cells.

In one aspect, the present disclosure is directed at a management server. The management server can comprise an interface configured to communicate via a wireless network (e.g., via a wireless base station such as, but not limited to, a nodeB or an eNodeB base station) with at least a first user equipment (UE) associated with a first cell being served by a first base station and a second UE associated with a second cell being served by a second base station; and a processor in communication with the interface. The management server can be configured to receive a first compressed mode request from the first UE which requests from the management server a first time slot within a predetermined period in which the first UE can enter compressed mode; and receive a second compressed mode request from the second UE which requests from the management server a second time slot within the predetermined period in which the second UE can enter compressed mode. In response to the first compressed mode request, the management server can determine the first time slot. Furthermore, in response to the second compressed mode request, the management server can determine the second time slot based on the first time slot.

In some embodiments, the first cell and the second cell can be small cells or macrocells.

In some embodiments, the management server can be further configured to receive a third compressed mode request from a third UE which requests from the management server a third time slot within the predetermined period in which the third UE can enter compressed mode, wherein the third UE is associated with at least one of the first cell and the second cell. In response to the third compressed mode request, the management server can be configured to determine the third time slot based on at least one of the first time slot and the second time slot.

In some embodiments, the third UE can associated with the first cell, and the management server can determine the third time slot by adding to the first time slot a number of frames based on dividing the predetermined period into a number of sub-periods of equivalent length.

In some embodiments, the management server can determine the third time slot so as to maximize a distance in time between the first time slot and the third time slot within the predetermined period.

In some embodiments, the management server can determine the second time slot based on a number of cells under management by the management server, and a maximum number of UEs within one cell which can be permitted to go into compressed mode within one predetermined period.

In some embodiments, the management server can determine the second time slot based on dividing a number of frames in the predetermined period by a number of cells under management by the management server.

In some embodiments, the predetermined period can consist of at least one of 24 frames and 32 frames.

In another aspect, the present disclosure is directed at a method for scheduling compressed mode time slots for a plurality of user equipments (UEs) associated with a plurality of cells. The method can comprise receiving, at a management server, a first compressed mode request from a first UE which requests from the management server a first time slot within a predetermined period in which the first UE can enter compressed mode, wherein the first UE is associated with a first cell being served by a first base station. The method can further comprise receiving, at the management server, a second compressed mode request from a second UE which requests from the management server a second time slot within the predetermined period in which the second UE can enter compressed mode, wherein the second UE is associated with a second cell being served by a second base station. The method can further comprise determining, at the management server, in response to the first compressed mode request, the first time slot; and determining, at the management server, in response to the second compressed mode request, the second time slot based on the first time slot.

In some embodiments, the method can further comprise receiving, at the management server, a third compressed mode request from a third UE which requests from the management server a third time slot within the predetermined period in which the third UE can enter compressed mode, wherein the third UE is associated with at least one of the first cell and the second cell; and determining, at the management server, in response to the third compressed mode request, the third time slot based on at least one of the first time slot and the second time slot.

In some embodiments, the third UE can be associated with the first cell, and determining the third time slot can comprise adding to the first time slot a number of frames based on dividing the predetermined period into a number of sub-periods of equivalent length.

In some embodiments, determining the third time slot can comprise maximizing a distance in time between the first time slot and the third time slot within the predetermined period.

In some embodiments, determining the second time slot can be based on a number of cells under management by the management server, and a maximum number of UEs within one cell which can be permitted to go into compressed mode within one predetermined period.

In some embodiments, determining the second time slot can be based on dividing a number of frames in the predetermined period by a number of cells under management by the management server.

In another aspect, the present disclosure is directed at a system for decreasing interference in a wireless network. The system can comprise a first base station associated with a first cell configured to communicate via a wireless link with at least a first user equipment (UE); and a second base station associated with a second cell configured to communicate via a wireless link with at least a second user equipment (UE). The first base station can be configured to determine a first time slot within a predetermined period in which the first UE can enter compressed mode. The second base station can be configured to determine a second time slot within the predetermined period in which the second UE can enter compressed mode based on the first time slot.

In some embodiments, the system can further comprise a management server configured to send information regarding the second base station to the first base station, and to send information regarding the first base station to the second base station. The first base station can be configured to determine the first time slot based on information received from the management server; and the second base station can be configured to determine the second time slot based on information received from the management server.

In some embodiments, the first base station can be further configured to communicate with a third UE associated with the first cell, and to determine a third time slot within the predetermined period in which the third UE can enter compressed mode based on at least one of the first time slot and the second time slot.

In some embodiments, the first base station can determine the third time slot so as to maximize a distance in time between the first time slot and the third time slot within the predetermined period.

In some embodiments, the second base station can be configured to determine the second time slot based on a number of cells under management by the management server, and a maximum number of UEs within one cell which can be permitted to go into compressed mode within one predetermined period.

In some embodiments, the second base station can be configured to determine the second time slot based on dividing a number of frames in the predetermined period by a number of cells under management by the management server.

In another aspect, the present disclosure is directed at a method for decreasing interference in a wireless network. The method can comprise determining, at a first base station associated with a first cell, a first time slot within a predetermined period in which a first user equipment (UE) associated with the first cell can enter compressed mode. The method can further comprise determining, at a second base station associated with a second cell, a second time slot within the predetermined period in which a second user equipment (UE) associated with the second cell can enter compressed mode based on the first time slot.

In some embodiments, the method can further comprise sending, from a management server, information regarding the second base station to the first base station; and sending, from the management server, information regarding the first base station to the second base station. The determination of the first time slot at the first base station can be based on the information received from the management server regarding the second base station. Furthermore, the determination of the second time slot at the second base station can be based on the information received from the management server regarding the first base station.

In some embodiments, the method can further comprise determining, at the first base station, a third time slot within the predetermined period in which a third user equipment (UE) associated with the first cell can enter compressed mode based on at least one of the first time slot and the second time slot.

In some embodiments, the third time slot can be determined so as to maximize a distance in time between the first time slot and the third time slot within the predetermined period.

In some embodiments, the determination of the second time slot at the second base station can be based on a number of cells under management by the management server and a maximum number of UEs within one cell which can be permitted to go into compressed mode within one predetermined period.

In some embodiments, the determination of the second time slot at the second base station can be based on dividing a number of frames in the predetermined period by a number of cells under management by the management server.

Overview

User Equipments (UE's) in the middle of a call or other data session using a first radio frequency or radio access technology sometimes need to make measurements of wireless signal conditions on another frequency or radio technology. These measurements can be used to, for example, determine whether the UE should switch from one type of radio technology to another based on the presence or absence of signal interference or the strength of a base station's signal at the other frequency or radio access technology. They can also be used to inform the UE whether or not it should switch from being connected to a first cell to a second cell. Compressed mode, also known as Slotted Mode, is a mode occupied by a UE and the base station with which the UE is communicating that allows the UE to simultaneously make measurements on a different frequency (inter-frequency) or radio access technology (inter-RAT) while in the middle of a call/data session.

In Compressed Mode the transmission and reception of data on the current call/data session are stopped for a short time and measurements are performed on the other frequency or RAT in that time. After the scheduled time is over, the transmission and reception of data on the current call resumes. Under the widely used SF/2 method for entering compressed mode, to make sure that data is not lost while transmission and reception are temporarily stopped, the data on the current call/data session is compressed immediately before and after the scheduled gap, such that the same amount of data is conveyed in a shorter period of time, thereby making space for measurements to be performed.

FIG. 1 is an exemplary transmission strength vs. time graph showing the operation of compressed mode, according to some embodiments. The vertical axis shows the strength of transmissions of uplink and downlink data passing to and from the UE and a base station to which the UE is connected. The horizontal axis depicts the passage of time. The time axis can be divided into a series of "frames" $101a$, $101b$, $101c$, $101d$, etc. These "frames" can be designated by a System Frame Number (SFN) (which has a range from 0 to 4095, i.e., $2^{12}-1$) and/or a Connection Frame Number (CFN) (which has a range from 0 to 255, i.e., $2^8-1$). In some embodiments, one frame can be 10 ms long. During a regular frame, e.g., frame $101a$, $101c$ and $101d$, transmissions between the UE and the base station can be sent at a first transmission strength level 102. When the UE goes into compressed mode at frame $101b$, a gap 106 is scheduled in the middle of the frame to enable the UE to take inter-frequency or inter-RAT measurements. To prevent data loss, data immediately before and after the gap 106 is "compressed" by, for example, increasing the transmission strength to a second, higher level 104.

The increase in transmission strength immediately before and/or immediately after a UE enters compressed mode can introduce interference for UEs in the same cell or in neighboring cells. As used herein, the term "cell" can refer to macrocells that provide radio coverage by a high powered cellular base station or tower mounted on, for example, ground based masts, rooftops and other existing structures. The term can also refer to small cells, such as femtocells, picocells, and metrocells, which are served by low power cellular base station or tower that covers a limited geographical area, such as a mall, hotel, or transportation hub. Small cells can be Universal Mobile Telecommunications Systems (UMTS) small cells, in some embodiments. The sudden increase in interference caused by a UE entering compressed mode can cause other UEs in the same cell or in neighboring cells to increase its transmission power level to compensate. This increase in transmission power level can in turn affect other UE's in the system, and this cascading effect can detrimentally affect signal conditions for all UE's in the same cell and/or in neighboring cells. It can take some time for the system to converge back to a stable transmission power.

For example, the added interference from a UE going into compressed mode can cause other UE's to miss the Transmission Power Control (TPC) command (which is used to regulate transmission signal strengths) from the base station (e.g., nodeB) to the UE. Similarly, the added interference from a UE going into compressed mode can cause the base station (e.g., nodeB) to miss TPC commands from the UE going into compressed mode or from other UEs. When the UE comes out of compression mode, the UE and/or the base station with which the UE is communicating can overcompensate by increasing transmission power levels too quickly or too much. During this period, for example, the UE can try to converge to a transmission power value in uplink as required by a target Signal to Interference Ratio (SIR). Similarly, the base station (e.g., nodeB) can try to converge to a transmission power value in the downlink direction as well. Other UE's in the system, either in the same cell or in neighboring cells (if the neighboring cell uses the same frequency), can also try to compensate for the added interference and in so doing may add to the overall noise level of the system.

The problem of compressed mode interference is exacerbated when multiple UEs in the same cell or in neighboring cells go into compressed mode within a relatively short period of time. One way to minimize the interference caused by multiple UE's going into compressed mode is to separate out the transmission gaps in time. A coordinating management server in communication with multiple UE's in the same cell or in multiple neighboring cells can ensure that a significant amount of time passes between any two UE's going into compressed mode, thereby mitigating the effects of interference caused by compressed mode. In some embodiments, the coordinating management server can maximize the time gaps between any two UE's going into compressed mode across all cells under management. Also, by ensuring that two UE's do not go into compressed mode at the same time, the amplitude of noise introduced by compressed mode is minimized.

Figure 2:
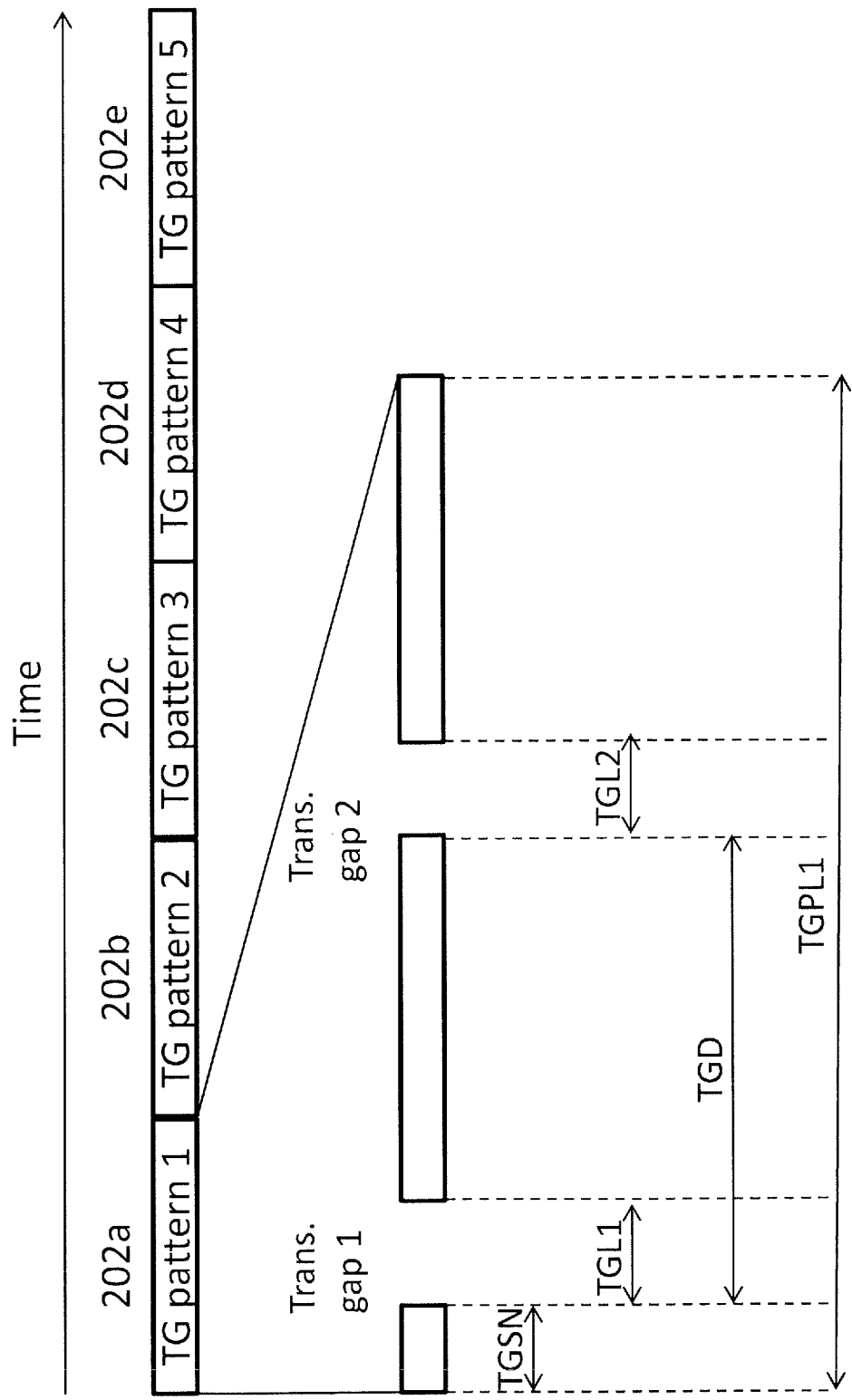
FIG. 2 is a timing diagram showing how gaps for UEs to go into compression mode can be scheduled, in accordance with certain embodiments.

FIG. 2 is a timing diagram illustrating how transmission gaps for a single UE can be scheduled. The horizontal axis represents the passage of time from left to right. The time axis can be broken down into repeating periods, e.g., Transmission Gap (TG) pattern 1 ($202a$), TG pattern 2 ($202b$), TG pattern 3 ($202c$), etc. Each period comprises a number of frames (e.g., SFNs or CFNs). The exact number of frames in one period can vary in different embodiments but in a preferred embodiment can be 32 frames, or some other whole number factor of 256 (the currently supported numerical range of CFNs). TGSN is the number of frames from the beginning of a period to the first transmission gap. TGL1 is the length of the first transmission gap, expressed in number of frames. TGL2 is the length of a second transmission gap, if one exists. TGD is the length of time between the beginning of the first transmission gap and the beginning of the second transmission gap, expressed in number of frames. TGPL1 is the number of frames in one period, which, as discussed previously, can be 32 frames in a preferred embodiment.

Figure 3:
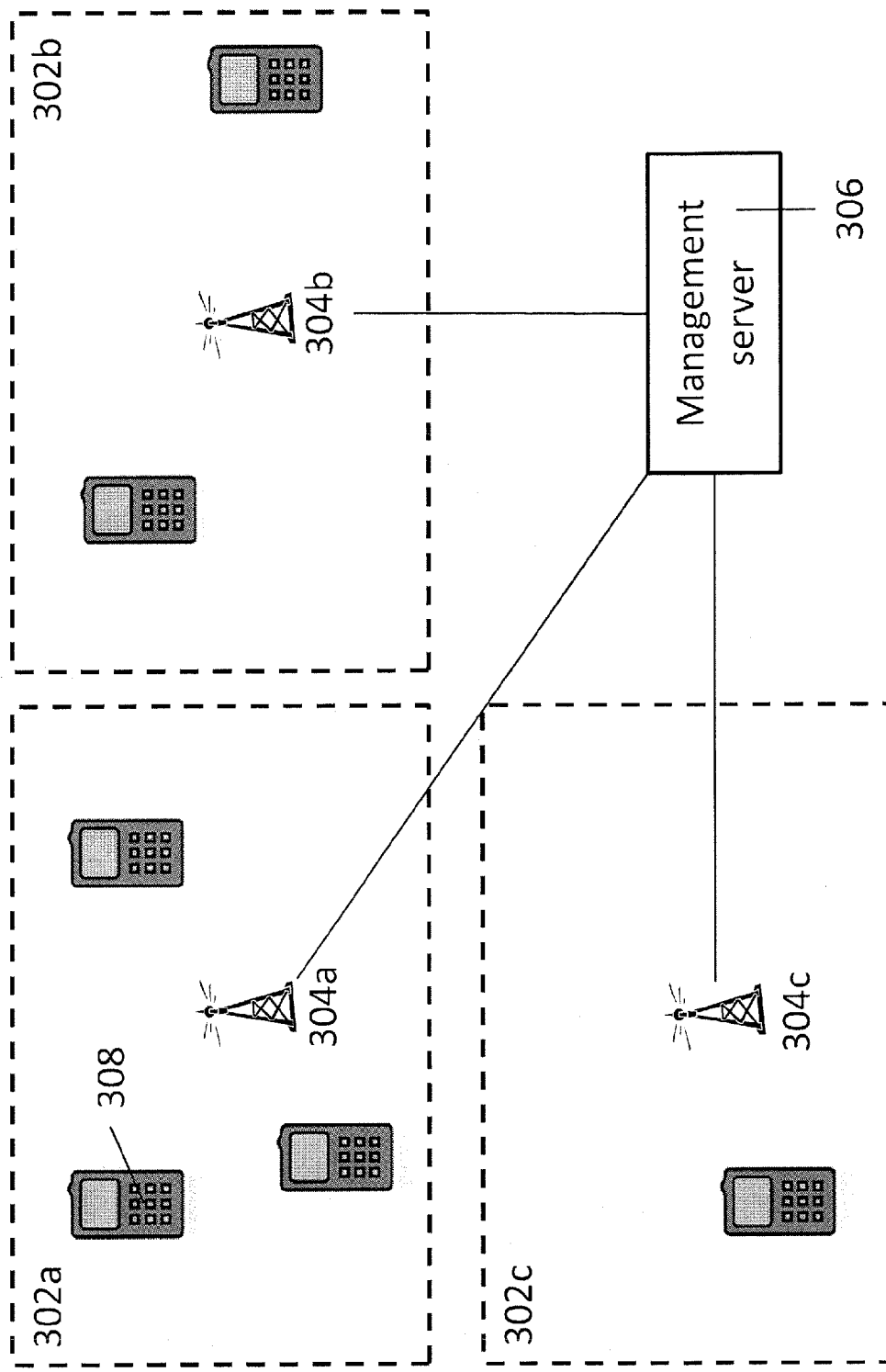
FIG. 3 is a network diagram illustrating three base stations associated with three different cells connected with a management server for mitigating compression mode interference, in accordance with certain embodiments.

FIG. 3 shows an exemplary system of three neighboring cells being managed by one management server. FIG. 3 includes three cells: 302a, 302b and 302c. In some embodiments, these cells can be small cells (e.g., femto-cells, pico-cells, or metro-cells). In other embodiments, these cells can be macrocells in a mobile phone or data network. Each cell can correspond to a geographical area being served by a base station 304, which can be, for example, a nodeB base station. For example, cell 302a can be served by base station 304a, cell 302b can served by base station 304b, and cell 302c can be served by base station 304c. Each cell can serve a variable number of UE's 308. In the exemplary configuration shown in FIG. 3, there are 3 UE's 308 in cell 302a, two UE's 308 in cell 302b and one UE 308 in cell 302c. Each base station 304a, 304b and 304c can be managed by a management server 306. While only three cells are illustrated in this example, an arbitrary number of neighboring cells can be managed by the management server 306. In some embodiments, management server 306 can be implemented by a plurality of networked servers in communication with one another rather than a single device. In other embodiments, management server 306 can be implemented as part of base station 304a, 304b or 304c rather than as a separate, stand-alone device.

Figure 4:
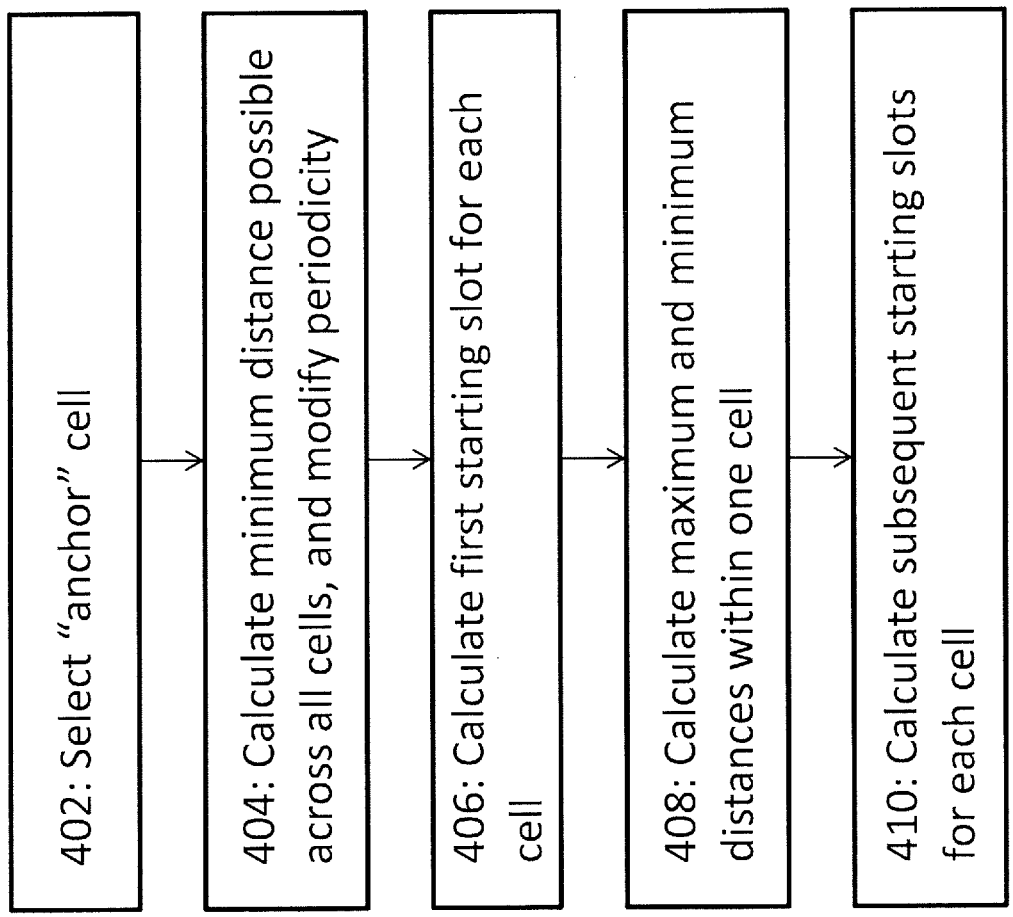
FIG. 4 is an exemplary flowchart illustrating a method for scheduling compression mode time slots for different UEs in different cells, in accordance with certain embodiments.

FIG. 4 illustrates an exemplary process for assigning time slots for UE's requesting permission to enter compressed mode such that the interference caused by each UE's entrance into compressed mode is spread out over time. Assume for the purposes of this illustration that each UE need only go into compressed mode once per period, such that TGL2=0, and TBD=∞ (no second gap). The purpose and result of the process in FIG. 4 is to determine a TGSN for each UE that requests permission to enter compressed mode such that the distance in time between any two UE's entering compressed mode across all cells under management by management server 306 is maximized.

Let $N_{cell}$ be the number of neighboring cells being managed by management server 306. In the exemplary embodiment shown in FIG. 3, $N_{cell}$=3. Let P be the number of frames within one transmission gap pattern, or one period as shown in FIG. 2. As an example only, let P=32, although higher or lower numbers of P are also possible. Let $N_{UE}$ be the maximum number of UE's that a single cell can allow to go into compressed mode within a single period. As an example only, let $N_{UE}$=4, such that a single cell can accommodate four separate UE's going into compressed mode within a single period of 32 frames.

$N_{cell}$, P, and $N_{UE}$ are all configurable parameters that may be adjusted in different embodiments. For example, the parameter P can be adjusted to a larger number than 32 for embodiments in which the management server 306 is managing macrocells, as opposed to small cells. Since macrocells can serve a much higher number of UEs than a small cell, a larger number of slots in the period P is required to accommodate the larger number of requests from UEs to enter compressed mode.

At step 402, an "anchor" cell can be selected from among the different cells under management by the management server 306. In some embodiments, this step can be performed by the management server 306, either according to a predetermined selection of a single cell as a permanent anchor cell, or according to a dynamic selection of a cell as a temporary anchor cell using coordination messages between each of the cells directly. Selection of an "anchor" cell can be used to coordinate times and frame numbers between different cells. FIG. 5 depicts an exemplary situation where the frame numbers of cell B lags 5 frames behind the frame numbers of cell A, and the frame numbers of cell C lags 10 frames behind the frame numbers of cell A. To prevent confusion, the system can select an "anchor" cell such that all frame numbers across all three cells can be expressed in terms of that cell's frame numbers. For example, if cell A is selected as an anchor cell, all frame numbers referenced in the rest of the process depicted in FIG. 4 will be expressed in terms of frame numbers at cell A. To arrive at the frame number for cell B, the system can subtract 5 frames from the frame number of the anchor cell A. Similarly, to arrive at the frame number for cell C, the system can subtract 10 frames from the frame number of anchor cell A. In some embodiments, this coordination and synchronization can be conducted by the management server. In other embodiments, this coordination and synchronization can be conducted entirely by the base stations 304a, 304b and 304c without any intervention from the management server 306. For instance, base station 304b can detect that it is lagging 5 frames behind base station 304a by listening in to cell A's broadcasts (network listen) or by receiving information from UE's (e.g., through Radio Resource Control (RRC) messages) that are or had recently been connected to cell A. Similarly, base station 304c can detect that it is lagging 10 frames behind base station 304a by listening in to cell A's broadcasts (network listen) or by receiving information from UE's (e.g., through Radio Resource Control (RRC) messages) that are or had recently been connected to cell A.

At step 404, the minimum possible time distance between UE's going into compressed mode can be calculated. In some embodiments, this step can be performed by the management server 306. In other embodiments, this step can be performed by each of the base stations 304a, 304b and 304c based on information provided by the management server 306. As discussed previously, a single UE going into compressed mode in any one of a set of neighboring cells can cause interference at the other cells. The system can therefore be configured to maximize the time distance not only between multiple UE's going into compressed mode within a cell, but also between UE's going into compressed mode across all cells under management by management server 306. In the example where $N_{cell}$=3, $N_{UE}$=4, and P=32, there are 32 frames within a single period to be shared between a maximum of $N_{cell} \cdot N_{UE}$=3·4=12 UE's. Therefore, in a worst case scenario where all cells (in this example, 3 cells) must accommodate the maximum number of UE's requesting compressed mode within the same period, the minimum possible time distance between any two UE's going into compressed mode is FLOOR(P/($N_{cell} \cdot N_{UE}$)) =FLOOR(32/(3·4))=FLOOR(2.6666)=2, where the FLOOR (X) operation returns the integer component of X but excludes any fractional or decimal portion of X.

Knowing the minimum possible time distance between UE's going into compressed mode enables the system to modify the periodicity from P to $P_{mod}$ to simplify the task of allocating frames to UE's for going into compressed mode. In some embodiments, $P_{mod}$ can be calculated as the product of three numbers: (i) the minimum possible time distance, (ii) $N_{cell}$, and (iii) $N_{UE}$. Continuing with the example above, if the minimum possible time distance is 2 frames, the system can modify the periodicity to $P_{mod}$=2·3·4=24. In the context of this application and claims, "modify the periodicity to N frames" or "modify the periodicity to N" refers to considering only the first N frames within a period P for allocation to UE's, and disregarding the remaining frames within a period P. In this example, by modifying the periodicity to $P_{mod}=24$, the system (e.g., management server 306) can allocate UE's only to the first 24 frames within the 32 frame period (i.e., frames 0 to 23). While this methodology wastes slots 24 to 31, this exemplary algorithm simplifies the task of assigning UE's requesting permission to enter compressed mode to frames. Other algorithms to distribute the frames within a period to UE's requesting permission to enter compressed mode are also possible, such as algorithms based on individual cell load and cell edge considerations.

At step 406, the system can calculate the first starting slot for each cell (e.g., for each of cells A, B, and C). This step can be performed by the management server 306 and/or the base stations 304a, 304b and 304c. The "first starting slot for a cell" in this context refers to the frame number of the slot that is assigned to the first UE to request permission to enter compressed mode in that cell. Since the objective of this system is to spread out in time the occurrence of UE's going into compressed mode across all cells under management, the starting slot for each cell can be calculated by assigning frame 0 to a first cell, assigning frame $P_{mod} N_{cell}$ to a second cell, assigning frame $2 \cdot P_{mod} N_{cell}$ to a third cell, and so on and so forth until all cells have been assigned starting frames. Continuing with the example given above, cell A can be assigned a starting slot of 0, cell B can be assigned a starting slot of $P_{mod}/N_{cell}=24/3=8$, and cell C can be assigned a starting slot of $2 \cdot P_{mod}/N_{cell}=2 \cdot 24/3=16$. As discussed above, all frame numbers are expressed in terms of the frame numbers in the anchor cell; in this example, cell A. Therefore, the first UE to request permission to enter compressed mode in cell A will be given frame number 0. The first UE to request permission to enter compressed mode in cell B will be given frame number 8. Finally, the first UE to request permission to enter compressed mode in cell C will be given frame number 16.

At step 408, the maximum and minimum possible time distances within one cell can be calculated. This step can also be performed by the management server 306 and/or the base stations 304a, 304b and/or 304c based on information provided by the management server 306. The maximum possible time distance ($D_{max}$) and minimum possible time distance ($D_{min}$) refer to the maximum and the minimum number of frames between two UE's going into compressed mode within one cell under a best-case and worst-case scenario, respectively. These distances are useful for computing subsequent starting slots for each cell. The best-case scenario corresponds to the case where only two UE's are requesting permission to enter compressed mode within a single period at a single cell. The worst-case scenario corresponds to the case where the maximum number of UE's (e.g., $N_{UE}$) are requesting permission to enter compressed mode within a single period at a single cell. In general therefore, $D_{max}=P_{mod}/2$, while $D_{min}=P_{mod}/N_{UE}$. Continuing with the example above, therefore, $D_{max}=24/2=12$, while $D_{min}=24/4=6$.

At step 410, subsequent starting slots for UE's requesting permission to enter compressed mode at each cell can be calculated. This step can be performed by the management server 306 and/or the base stations 304a, 304b and/or 304c based on information provided by the management server 306. In some embodiments, this can be done by computing an optional distribution array of size $N_{cell}$ by $N_{UE}$, where array[i][j] (the element at the i'th row and the j'th column) denotes the frame number to be assigned to the j'th UE to request permission to enter compressed mode at cell i. In the example above, this optional distribution array would be an array of size 3 by 4, and array[A][3] would correspond to the frame number to be assigned to the third UE to request permission to enter compressed mode at cell A. Similarly, array[C][2] would correspond to the frame number to be assigned to the second UE to request permission to enter compressed mode at cell C.

Figure 6:
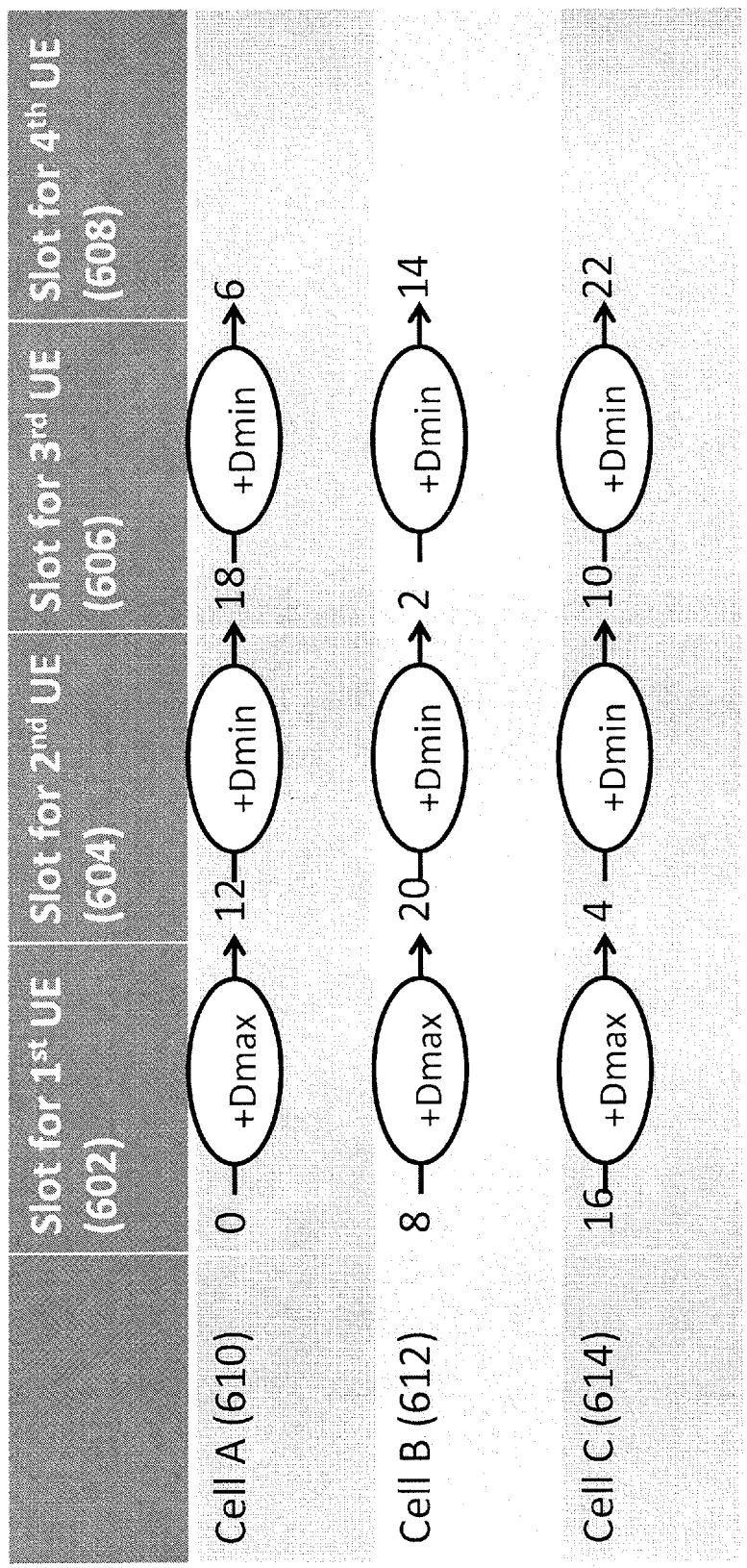
FIG. 6 is an exemplary distribution array assigning compression mode time slots to UE's in different cells so as to mitigate compression mode interference, in accordance with certain embodiments.

FIG. 6 depicts an exemplary optional distribution array, according to the example discussed above. This distribution array is presented as an example method for allocating compressed mode time slots to UEs from one or more cells, and many alternative methods are also possible. In one embodiment, this exemplary optional distribution array can be computed and stored at the management server 306. In other embodiments, this exemplary optional distribution array can be computed and stored at the base stations 304a, 304b and/or 304c. As can be seen, the array comprises three rows, one for each cell: a row 610 for cell A, a row 612 for cell B, and a row 614 for cell C. The array also comprises four columns: columns 602, 604, 606 and 608 corresponding to the $1^{st}$, $2^{nd}$, $3^{rd}$, and $4^{th}$ UE to request permission to enter compressed mode, respectively. The results of step 408 can be used to populate the first column 602. As can be seen, the frame to be assigned to the $1^{st}$ UE to request permission to enter compressed mode is 0 for cell A, 8 for cell B, and 16 for cell C, as previously discussed.

To derive the values for the second column 604, the system (e.g., management server 306 and/or base stations 304a, 304b, and/or 304c) can add $D_{max}$ to the values in the first column 602, and then compute the modulos of the sum over $P_{mod}$. Computing the modulos of the sum over $P_{mod}$ can be helpful because if the sum of $D_{max}$ and the values in the first column 602 exceed $P_{mod}$, the system (e.g., management server 306 and/or base stations 304a, 304b, and/or 304c) will schedule the compressed mode transmission in the next transmission period rather than this one. For instance, the second UE to request permission to enter compressed mode in cell A can be given the slot at frame number $(0+D_{max})$ modulo $P_{mod}=(0+12)$ modulo $24=12$, which maximizes the time distance between the first and the second UE's compressed mode transmissions. Similarly, the second UE to request permission to enter compressed mode in cell B can be given the slot at frame number $(8+D_{max})$ modulo $P_{mod}=(8+12)$ modulo $24=20$. The second UE to request permission to enter compressed mode in cell C can be given the slot at frame number $(16+D_{max})$ modulo $P_{mod}=(16+12)$ modulo $24=28$ modulo $24=4$.

To derive the values for the third column 606, the system (e.g., management server 306 and/or base stations 304a, 304b, and/or 304c) can add $D_{min}$ to the values in the second column 604, and then compute the modulus of the sum over $P_{mod}$. For example, the third UE to request permission to enter compressed mode in cell A can be given the slot at frame number $(12+D_{min})$ modulo $P_{mod}=(12+6)$ modulo $24=18$. The third UE to request permission to enter compressed mode in cell B can be given the slot at frame number $(20+D_{min})$ modulo $P_{mod}=(20+6)$ modulo $24=2$. The third UE to request permission to enter compressed mode in cell C can be given the slot at frame number $(4+D_{min})$ modulo $24=(4+6)$ modulo $24=10$.

To derive the values for additional columns in the distribution array, such as the fourth column 608, the system (e.g., management server 306 and/or base stations 304a, 304b, and/or 304c) can continue adding $D_{min}$ to the values from the previous columns, then computing the modulos of the sum over $P_{mod}$. Eventually, however, continuing to add $D_{min}$ to the values from the previous columns will result in arriving at a value that is the same as a value in a previous column. Taking cell A for example, $(18+D_{min})$ modulo $24=(18+6)$ modulo $24=0$. However, frame number 0 has already been taken by the $1^{st}$ UE to request permission to enter compressed mode (as can be seen at array[A][1]). In these instances, where the system detects that adding $D_{min}$ will result in a conflict with an existing slot allocation, the system can add a second $D_{min}$. Continuing with cell A as an example, since slot 0 is taken, the system can add a second $D_{min}$ (6) to arrive at a value of $0+6=6$ for array[A][4].

Turning now to cell B, $(2+D_{min})$ modulo $24=(2+6)$ modulo $24=8$. However, slot 8 is already taken by the $1^{st}$ UE to request permission to enter compressed mode at cell B (as can be seen at array[B][1]). Therefore, the system can add a second $D_{min}$. Since slot 8 is taken, the system will add a second $D_{min}$ (6) to arrive at a value of 14 for array[B][4]. Similarly for cell C, since $(10+D_{min})$ modulo $24=(10+6)$ modulo $24=16$, and since 16 is taken by the $1^{st}$ UE to request permission to enter compressed mode at cell C, the system will add a second $D_{min}$ to arrive at a value of $16+6=22$ for array[C][4].

Since the array's frame numbers are all expressed in terms of frame numbers for the "anchor" cell, the system can convert the values in the array back into frame numbers for non-anchor cells. For example, the system can subtract 5 frames to retrieve the correct frame numbers for cell B, and can subtract 10 frames to retrieve correct frame numbers for cell C.

If at any point any of the UE's that had been assigned a slot subsequently exits compressed mode, that slot can be freed up for another UE that requests permission to enter compressed mode. Considering cell A for example, if, after the $3^{rd}$ UE has been assigned a slot of frame number 18 as per array[A][3], the $1^{st}$ UE exits compressed mode, the slot at frame number 0 (array[A][1]) will be freed up for allocation. Then if a subsequent UE requests permission to enter compressed mode, that UE can be allocated to the slot formerly occupied by the $1^{st}$ UE, i.e., frame number 0. There would be no need to allocate the subsequent UE to frame number 6, as per array[A][4].

This methodology can be used to allocate multiple UE's in multiple cells to time slots for entering compressed mode that can spread out the interference that results from compressed mode over time, and thereby minimize the interference disruption to the entire system of cells. As a further illustrative example, say 2 UE's in cell A request permission to go into compressed mode at Connection Frame Number (CFN)=34 (as discussed above, CFN's have a range from 0 to 255). In an embodiment using a centralized Self-Organizing Network (SON) architecture, each of the UE 308's in cell A can send a compressed mode request message to management server 306 via base station 304*a*. The compressed mode request message can comprise a Radio Request Control (RRC) message in certain embodiments, and can request from the management server 306 a time slot in which the UE 308 can enter compressed mode. The message can sometimes take some time to be received by base station 304*a*, processed, and then forwarded to management server 306. As an example only, let this delay be equal to 12 CFN frames. Therefore, management server 306 first receives the compression-request message (e.g., RRC message) at CFN 34+12=46.

At this point, management server 306 can consult the distribution array described with reference to FIG. 6. In some embodiments, the distribution array can be pre-computed, while in other embodiments the distribution array can be computed at the time the first compressed mode request message is received. Management server 306 assigns the slot at array[A][1] to one of the UEs, and the slot at array[A][2] to the other UE. As depicted in FIG. 6, these slots are frame 0 for the first UE and frame 12 for the second UE. Since the management server 306 first received the compressed mode request message at CFN=46, and since P=32, management server 306 first received the compression-request message 46 modulo 32=14 frames into the second period P. If it is not too late to assign a slot to a UE within this period, the management server 306 will do so. If, however, as is the case here, it is too late to assign a slot in this period (since slots 0 and 12 of the second period P had already passed by the time management server first received the compressed mode request message at slot 14), the management server 306 will assign a slot in the next period of P frames. The next period will begin at CFN=P·2=32·2=64. The 0'th slot in this next period is therefore at CFN=64, and the $12^{th}$ slot in this next period is 64+12=76. Therefore, the management server 306 can assign CFN=64 to one UE and CFN=76 to the other UE. Management server 306 can notify the UE's as to their assigned slots for going into compression mode via a compression mode response message, which can be another RRC message sent to the UE's 308 via base station 304*a*.

To extend the example discussed above, assume further that a UE 308 in cell C also sends a compression mode request message at the same time as the UE's in cell A. Recall also that cell C is 10 frames behind cell A, which in this example is the anchor cell. Therefore, the UE in cell C sends its compression mode request message at CFN=34 under cell A's frame numbering system, but at CFN=34−10=24 under cell B's frame numbering system. Since the management server 306 has selected cell A as the anchor cell, management server 306 will conduct all its computations according to cell A's frame numbering system. If the delay attributable to transmission and processing is also 12 CFN frames, management server 306 will receive cell B's UE compression mode request message at CFN=46. At this point, management server 306 again consults the distribution array, specifically, the value at array[C][1] (i.e., the value for the $1^{st}$ UE to request compression mode at cell C). As shown in FIG. 6, this value is 16. The management server then determines if it is too late to assign a slot to the UE at cell C within this period. Since the management server received the compression mode request at CFN=46, and since P=32, the management server received the request at the 46−32=$14^{th}$ slot in the second period of this CFN cycle. Since 14 is less than 16, the management server determines that it is not too late to assign a slot to the UE at cell C within this period. Therefore, the management server directs the UE at cell C to go into compressed mode at CFN=32+16=48. In some embodiments, the management server 306 can direct the UE at cell C to go into compressed mode via a compression mode response message, which can be another RRC message sent to the UE 308 via base station 304*c*. To translate the CFN numbers from values corresponding to cell A (the anchor cell) back to cell C, either the management server 306, base station 304*c*, or UE 308 can simply subtract 10 from the listed CFN number.

In some embodiments, there may also be a delay in sending a compressed mode response message from the management server 306 back to a UE 308. For example, it may take another 12 CFN's for a message from the management server 306 to be transmitted back to a UE 308 and processed. Management server 306 can be configured to take this additional delay into account. Revisiting the example of the third UE 308 going into compressed mode in cell C discussed above, it may be that even if management server 306 immediately sends a compressed mode response message back to the UE 308 from cell C at CFN=46 (i.e., the instant management server 306 received the compressed mode request from the UE), the UE 308 from cell C will not receive the response from management server 306 until 46+12=58. Directing the UE 308 to enter compressed mode at CFN=48 may therefore be of no use to UE 308, since CFN=48 will already have passed by the time the UE 308 receives the response at CFN=58. In these situations, management server 306 can direct the UE to enter compressed mode during the next period. In this case, management server 306 can direct the UE to enter compressed mode at CFN=P·2+array[C][1]=32·2+16=80. Since UE 308 is expected to receive this instruction by CFN=58, the UE 308 will have plenty of time to prepare to enter compressed mode at CFN=80.

In other embodiments using a distributed Self-Organizing Network (SON) architecture, base stations 304a, 304b and 304c (and not management server 306) can be the network nodes responsible for allocating time slots for UEs requesting permission to go into compressed mode. These embodiments that use a distributed SON architecture can operate similarly to embodiments that use a centralized SON architecture except that compressed mode request messages from UE 308's are not forwarded to the management server 306, but are received and processed by base stations 304a, 304b and 304c directly. Management server 306 can be responsible for computing the distribution array illustrated in FIG. 6, or for collecting and providing the information necessary to compute the distribution array to base stations 304a, 304b and 304c. If management server 306 is responsible only for collecting and providing information necessary to compute the distribution array, each of base stations 304a, 304b and 304c can independently compute the distribution array according to the exemplary algorithm described above. For example, the management server 306 can provide to each of base stations 304a, 304b and 304c the number of cells under management, the maximum number of UEs which can be permitted to go into compressed mode at each cell, the modified periodicity $P_{mod}$, and/or any other variables or parameters described above. Each of the base stations 304a, 304b and 304c can then maintain the distribution array in its local memory. When a request from a UE 308 comes in for a time slot to enter compressed mode, the base stations 304a, 304b and 304c can then consult the distribution array stored in its local memory and assign a time slot accordingly, just as described above. Base stations 304a, 304b and 304c can also be configured to take into account any expected delay in message transmission and processing times between UEs 308 and base stations 304a, 304b and/or 304c, as described above.

The methods described above for allocating time slots to UEs requesting permission to enter compressed mode are exemplary only and are not intended to be limiting. Many other alternative methods for allocating time slots to UEs within one or more neighboring cells are also possible. For example, UE's located near the edge of a cell can affect neighboring cells more than UE's located near the center of a cell. In some embodiments, the system can allocate time slots to UE's near the edge of a cell using a first scheme, and can allocate time slots to UE's near the center of a cell using a second scheme. The first scheme can be configured to increase the minimum time distance between UE's going into compressed mode relative to the second scheme. In this way, the system can decrease the amount of interference caused to neighboring cells, while maintaining maximum flexibility to allocate time slots to UEs located near the center of a cell. As another example, it is observed that UE's that enter compressed mode in a macro cell must transmit at a higher power compared to UE's that enter compressed mode in a small cell. This is because the distance between a UE and the base station with which it is communicating is likely to be larger in a macro cell compared to a small cell. In some embodiments, therefore, the system can use one scheme for allocating time slots in a macro cell, and a different scheme for allocating time slots in a small cell. The scheme for macro cells can have a larger minimum time distance between UE's going into compressed mode relative to the scheme for small cells. Still other methods of allocating time slots to UEs within one or more cells so as to lessen interference caused by compressed mode are also possible and within the spirit of the invention.

Figure 7:
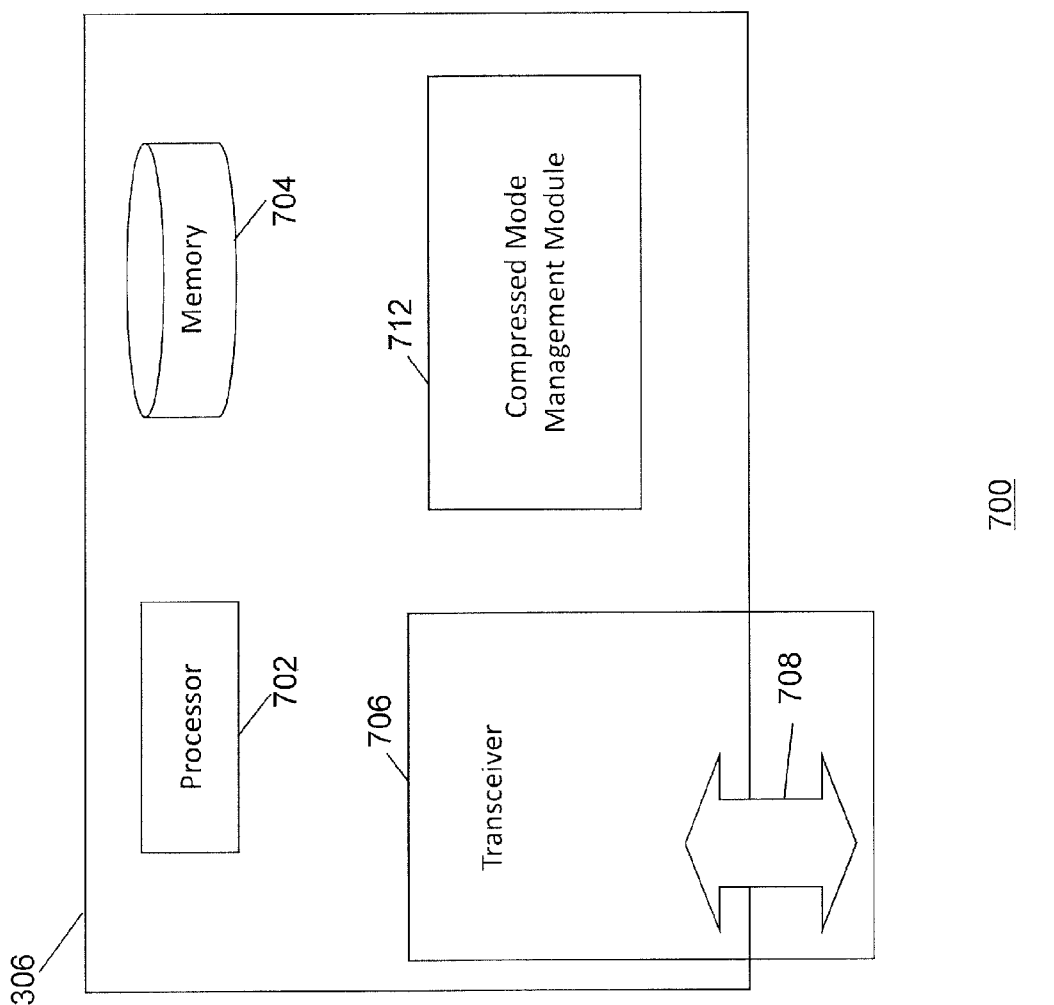
FIG. 7 is a logical diagram illustrating an exemplary management server, in accordance with certain embodiments.

FIG. 7 illustrates a logical view 700 of a management server 306 in accordance with certain embodiments. The management server can also be a Self-Organizing Network (SON) server, in some embodiments. The management server 306 can include a processor 702, a memory 704, a transceiver 706 including an interface 708, and a compressed mode management module 712. The interface 708 can be used for transmitting messages to and receiving messages from UEs 306 and base stations 304a, 304b and 304c via a wireless network. The management server 306 can be configured with one or more processors 702 that process instructions and run software that may be stored in memory 704. The processor 702 can also communicate with the memory 704 and interfaces to communicate with other devices. The processor 702 can be any applicable processor such as a system-on-a-chip that combines a CPU, an application processor, and flash memory. The interfaces can be implemented in hardware or software. The memory 704 can be any non-transitory computer readable medium, such as a magnetic disk drive, an optical drive, a programmable read only memory (PROM), Random Access Memory (RAM), or flash memory.

The Compressed Mode Management Module 712 can be a pure software module stored in memory 704 and executed on processor 702. Alternatively, Compressed Mode Management Module 712 can also be implemented as a dedicated hardware module within management server 306. Compressed mode management module 712 can be configured to keep track of the number of cells under management ($N_{cell}$), the maximum number of UE's that can be accommodated per cell ($N_{UE}$), and the periodicity P. These programmable parameters can be configured according to different embodiments and can be saved in memory 704. Compressed mode management module 712 can also be configured to implement the algorithm described above in relation to FIGS. 4-6. In particular, compressed mode management module can (i) select an anchor cell, (ii) convert all frame numbers into the frame numbering system used at the anchor cell, (iii) calculate the minimum time distance possible across all cells and modify the periodicity, and (iv) calculate and store in memory 704 the distribution array described in relation to FIG. 6.

Figure 8:
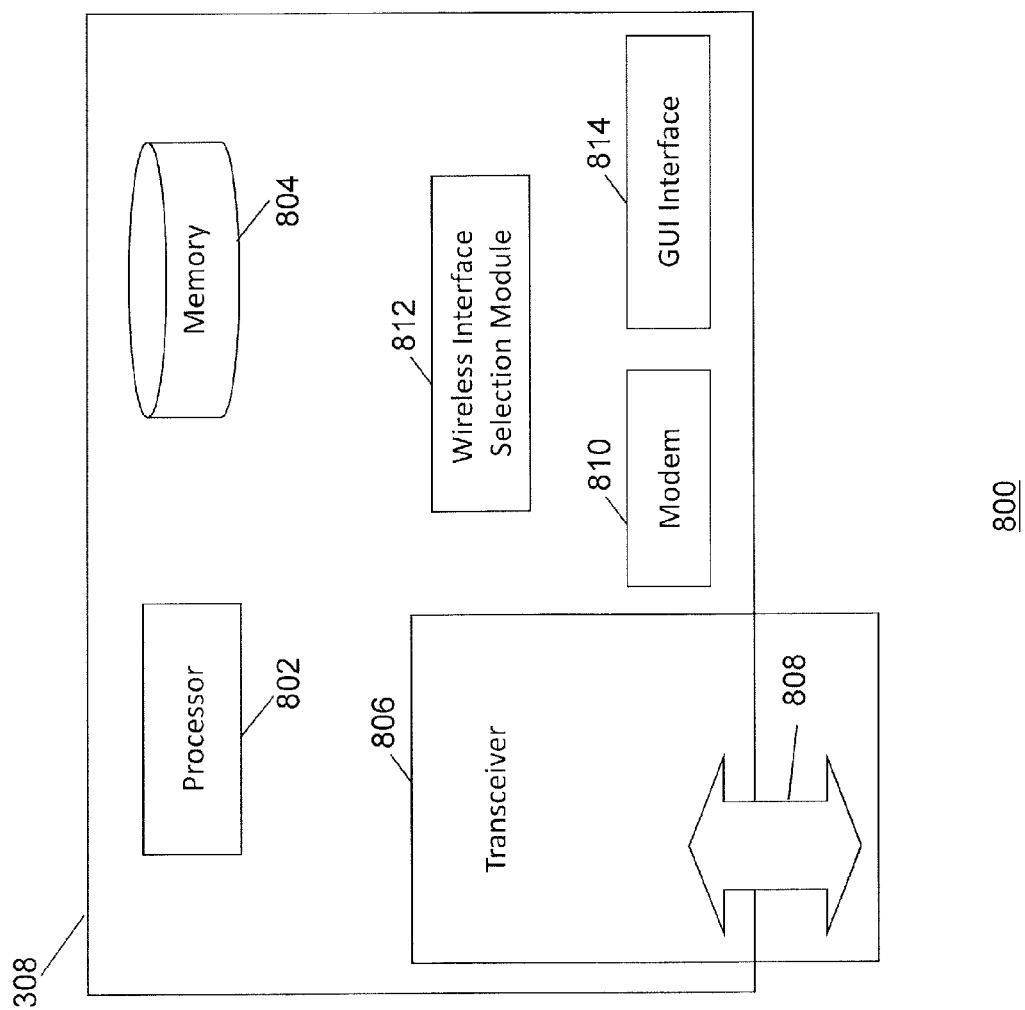
FIG. 8 is a logical diagram illustrating an exemplary UE, in accordance with certain embodiments.

FIG. 8 illustrates a logical view 800 of user equipment (UE) 308 in accordance with certain embodiments. The UE 308 can include a processor 802, a memory 804, a transceiver 806 including an interface 808, a modem 810, a wireless interface selection module 812, and a GUI interface 814.

The transceiver 806 includes a transmitter and a receiver. The transmitter and the receiver can be integrated into a single chip or can be embodied in separate chips. The transceiver 806 can also include an interface 808 that provides an input and/or output mechanism to communicate with other network devices. The interface 808 can measure the wireless signal strengths of wireless interfaces such as base stations and access points. The interface 808 can be implemented in hardware to send and receive signals in a variety of mediums, such as optical, copper, and wireless, and in a number of different protocols some of which may be non-transient.

The modem 810 is configured to implement modulation and framing of signals according to one or more communication standards. The communication standards include the cellular standards defined under 3GPP.

The wireless interface selection module 812 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 812 can select the serving wireless interface by analyzing data load information associated with wireless interfaces. In certain embodiments, the wireless interface selection module 812 can be configured to attach to a wireless interface handling the least amount of data traffic and/or with more available resources. In certain embodiments, the wireless interface selection module 812 can also analyze additional information to decide to which wireless interface to connect. For example, the wireless interface selection module 812 can use one or more of the following: the load condition associated with the candidate wireless interfaces, the wireless signal strength associated with the candidate wireless interfaces, and a configuration status on the wireless interface selection module 812 indicating whether the UE 308 favors the cellular network or the WLAN. In some embodiments, the load conditions associated with candidate wireless interfaces can be determined when the UE enters compressed mode to take inter-frequency and/or inter-RAT measurements.

The wireless interface selection module 812 can be implemented in software using memory 804 such as a non-transitory computer readable medium, a programmable read only memory (PROM), or flash memory. The software can run on a processor 802 that executes instructions or computer code. The wireless interface selection module 812 may also be implemented in hardware using an application specific integrated circuit (ASIC), programmable logic array (PLA), or any other integrated circuit.

The GUI interface 814 can provide communication with an input and/or output mechanism to communicate with UE users. UE users can use input/output devices to send/receive data to/from the UE 308 over the GUI interface 814. Input/output devices can include, but are not limited to, a keyboard, a screen, a touch screen, a monitor, and a mouse. The GUI interface 814 can operate under a number of different protocols. The GUI interface 814 can be implemented in hardware to send and receive signals in a variety of mediums, such as optical, copper, and wireless.

The UE 308 described above can communicate with a plurality of radio access networks using a plurality of access technologies and with wired communication networks. The UE 308 can be a smart phone offering advanced features and capabilities, such as word processing, web browsing, gaming, e-book capabilities, an operating system, and a full keyboard. The UE 308 may run an operating system such as Symbian OS, iPhone OS, RIM's Blackberry, Windows Mobile, Linux, Palm WebOS, and Android. The screen may be a touch screen that can be used to input data to the UE 308 and the touch screen can be used instead of the full keyboard. The UE 308 may have the capability to run applications or communicate with applications that are provided by servers in the communication network. The UE 308 can receive updates and other information from these applications on the network.

The UE 308 also encompasses many other devices such as televisions (TVs), video projectors, set-top boxes or set-top units, digital video recorders (DVR), computers, netbooks, laptops, and any other audio/visual equipment that can communicate with a network. The UE 308 can also keep global positioning coordinates, profile information, or other location information in its stack or memory. The UE 308 can have a memory such as a computer readable medium, flash memory, a magnetic disk drive, an optical drive, a programmable read-only memory (PROM), and/or a read-only memory (ROM). The UE 308 can be configured with one or more processors 802 that process instructions and run software that may be stored in memory 804. The processor 802 can also communicate with the memory 804 and interfaces to communicate with other devices. The processor 802 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 308 can also provide a variety of user interfaces (e.g., GUI Interface 814) such as a keyboard, a touch screen, a trackball, a touch pad, and/or a mouse. The UE 308 may also include speakers and a display device in some embodiments.

Any of the network components specified in this disclosure, including without limitation management server 306, can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 9:
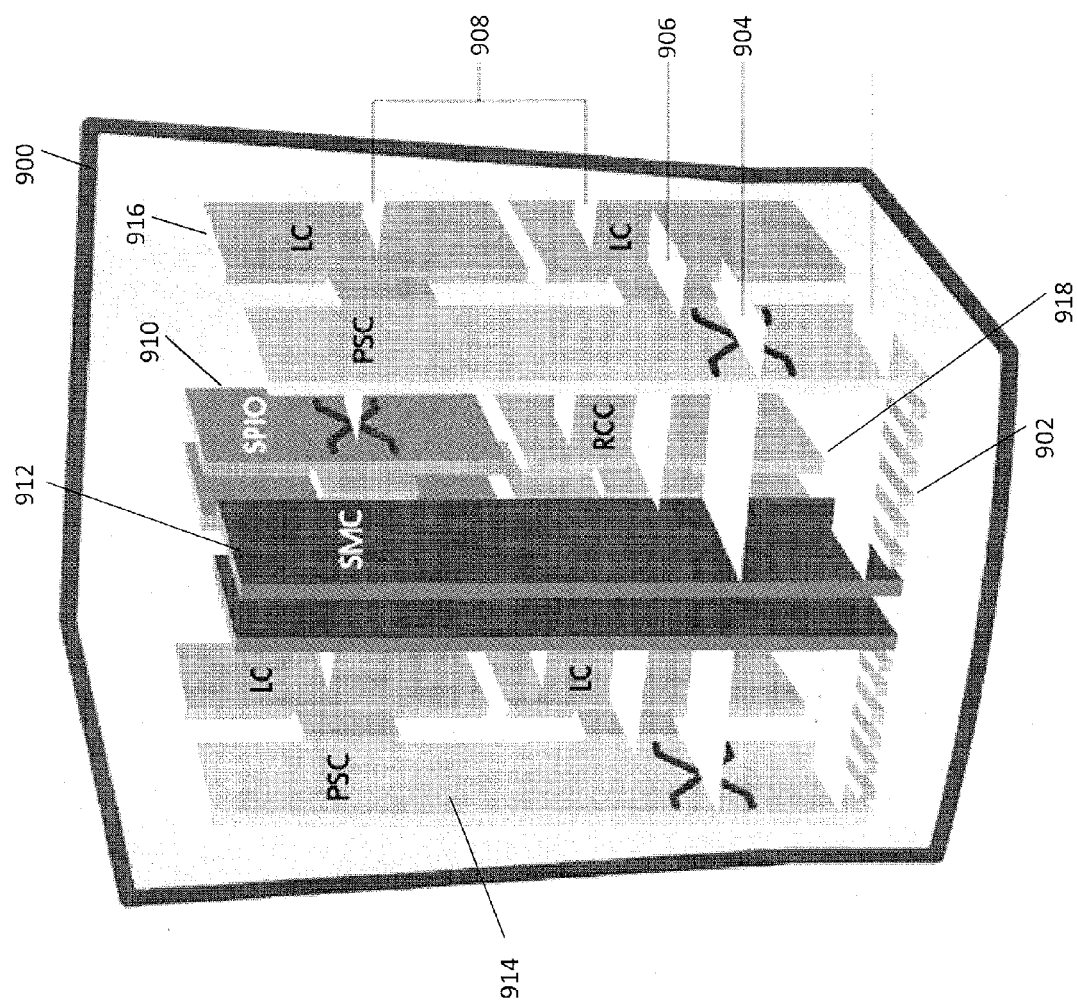
FIG. 9 illustrates the implementation of a network device, in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device 900 in accordance with some embodiments. The network device 900 includes slots 902 for loading application cards and line cards. A midplane can be used in the network device 900 to provide intra-network device communications, power connections, and transport paths between the various installed cards. The midplane can include buses such as a switch fabric 904, a control bus 906, a system management bus, a redundancy bus 908, and a time division multiplex (TDM) bus. The switch fabric 904 is an IP-based transport path for user data throughout the network device 900 implemented by establishing inter-card communications between application cards and line cards. The control bus 906 interconnects the control and management processors within the network device 900. The network device management bus provides management of system functions such as supplying power, monitoring temperatures, board status, data path errors, card resets, and other failover features. The redundancy bus 908 provides transportation of user data and redundancy links in the event of hardware failures. The TDM bus provides support for voice services on the system.

The network device 900 supports at least four types of application cards: a switch processor I/O card (SPIO) 910, a system management card (SMC) 912, a packet service card (PSC) 914, and a packet accelerator card (not shown). Other cards used in the network device 900 include line cards 916 and redundant crossbar cards (RCC) 918. The line cards 916, when loaded in the network device 900, provide input/output connectivity to the network and other devices, as well as redundancy connections. The line cards 916 include interfaces to the network through Ethernet, Fiber Optic, and/or any other communication mediums. The redundant crossbar card (RCC) 918 includes a non-blocking crossbar and connections to each of the cards in the network device 900. This allows a redundant connection to be made through the redundant crossbar card 918 from any one card to any other card in the network device 900. The SPIO card 910 serves as a controller of the network device 900 and is responsible for such things as initializing the network device 900 and loading software configurations onto other cards in the network device 900.

The system management card (SMC) 912 and switch processor card (not shown) are system control and management cards for managing and controlling other cards in the network device 900. The packet accelerator card (PAC) and packet service card (PSC) 914 provide packet processing, context processing capabilities, and forwarding capabilities among other things. The PAC and PSC 914 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 900 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 900 can be divided into a series of tasks that perform specific functions. These tasks communicate with each other as needed to share control and data information throughout the network device 900. A task is a software process that performs a specific function related to system control or session processing. Three types of tasks operate within the network device 900 in some embodiments: critical tasks, controller tasks, and manager tasks. The critical tasks control functions that relate to the ability of the network device 900 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 900) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 302), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 10:
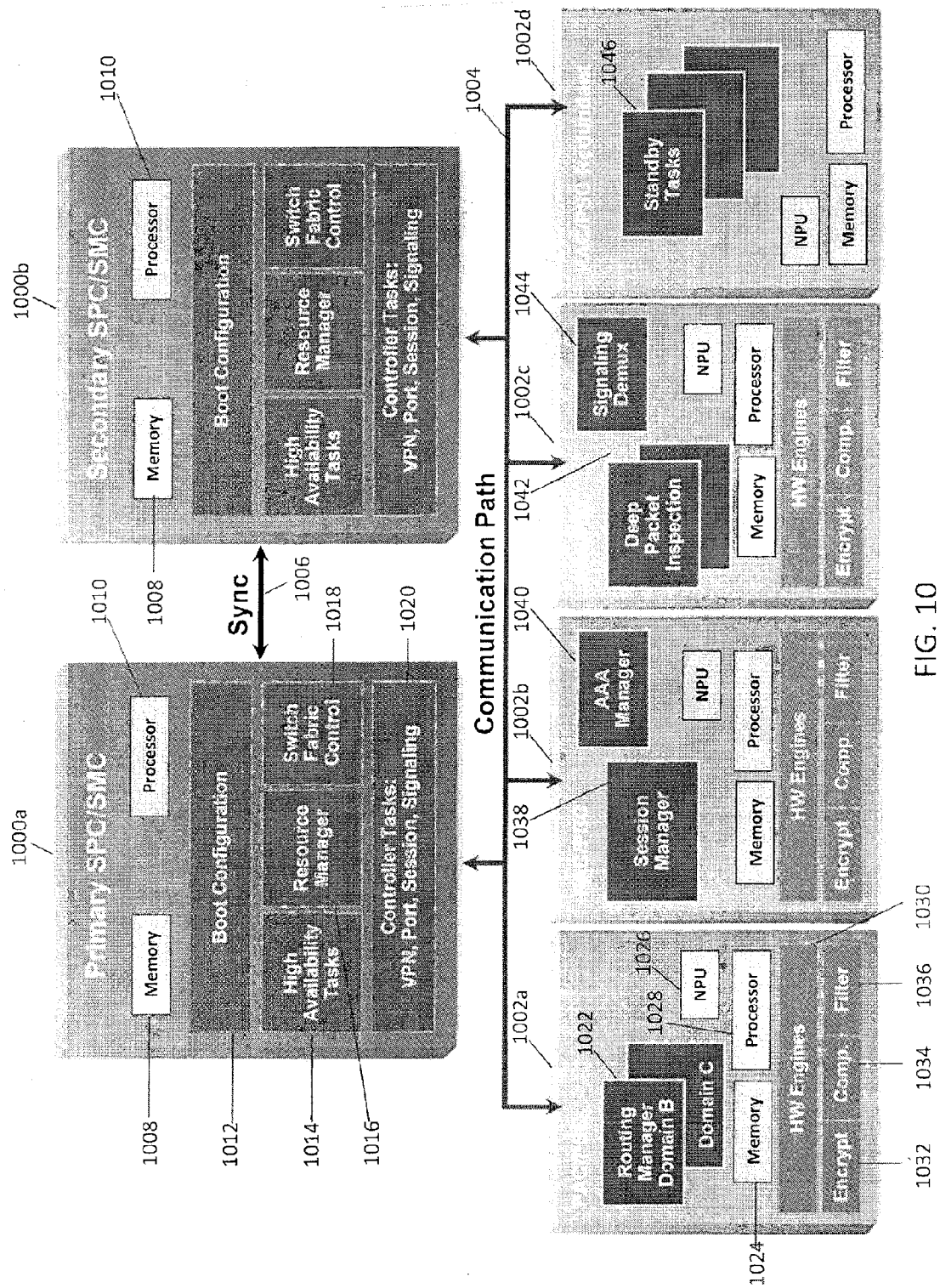
FIG. 10 is a logical view of the software architecture of a network device, in accordance with certain embodiments.

FIG. 10 illustrates a logical view 1000 of the software architecture of a network device (e.g., network device 900) in accordance with certain embodiments. As shown, the software and hardware can be distributed within the network device and across different circuit boards, processors, and memory. FIG. 10 includes a primary switch processor card (SPC)/system management card (SMC) 1000a, a secondary SPC/SMC 1000b, PAC/PSC 1002a-1002d, a communication path 1004, and a synchronization path 1006. The primary SPC/SMC 1000a and the secondary SPC/SMC 1000b each includes a memory 1008, a processor 1010, a boot configuration 1012, high availability tasks 1014, resource manager 1016, switch fabric control 1018, and controller tasks 1020.

The SPC/SMC 1000 (both primary and secondary) manages and controls the network device including the other cards in the network device. The SPC/SMC 1000 can be configured in a primary and secondary arrangement that provides redundancy and failsafe protection. The modules or tasks running on the SPC/SMC 1000 are related to network device wide control and management. The boot configuration task 1012 includes information for starting up and testing the network device. The network device can also be configured to startup in different configurations and providing different implementations. These can include which functionalities and services are capable of running on the SPC/SMC 1000. The high availability task 1014 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1000 or a PAC/PSC 1002, while some processor intensive tasks can also be performed across multiple PACs/PSCs to utilize multiple CPU resources. Distribution of these tasks is invisible to the user. The switch fabric control 1018 controls the communication paths in the network device. The controller tasks module 1020 can manage the tasks among the resources of the networks to provide, for example, VPN services, assign ports, and create, delete, and modify sessions for UE 308.

The PAC/PSC 1002 is a high-speed processing card that is designed for packet processing and the tasks involved with providing various network functionalities on the network device. The PAC/PSC 1002 include a memory 1024, a network processing unit (NPU) 1026, a processor 1028, a hardware engine 1030, an encryption component 1032, a compression component 1034, and a filter component 1036. Hardware engines 1030 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1002 is capable of supporting multiple contexts. The PAC/PSC 1002 is also capable of running a variety of tasks or modules. PAC/PSC 1002a provides routing managers 1022 with each covering routing of a different domain. PAC/PSC 1002b provides a session manager 1038 and an AAA manager 1040. The session manager 1038 manages one or more sessions that correspond to one or more UEs. A session allows a UE 308 to communicate with the network for voice calls and data. The AAA manager 1040 manages accounting, authentication, and authorization with an AAA server in the network. PAC/PSC 1002c provides a DPI task 1042 and a signaling demux 1044. The DPI task 1042 provides inspection of packet information beyond layer 4 for use and analysis by the network device. The signaling demux 1044 can provide scalability of services in combination with other modules. PAC/PSC 1002*d* provides redundancy through standby tasks 1046. Standby tasks 1046 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A management server, comprising:
   an interface to communicate with at least: (i) a first user equipment (UE) associated with a first cell to be served by a first base station and (ii) a second UE associated with a second cell to be served by a second base station; and
   a processor to communicate with the interface; the management server to:
   receive, from the first UE, a first compressed mode request that requests from the management server a first time slot within a predetermined period in which the first UE can enter compressed mode;
   receive, from the second UE, a second compressed mode request that requests from the management server a second time slot within the predetermined period in which the second UE can enter compressed mode;
   in response to the first compressed mode request, determine the first time slot; and
   in response to the second compressed mode request, determine the second time slot based on the first time slot, wherein the second time slot is determined based on dividing a number of frames in the predetermined period by a number of cells under management by the management server.

2. The management server of claim 1, wherein the first cell and the second cell are at least one of small cells and macrocells.

3. The management server of claim 1, wherein the management server is further to:
   receive, from a third UE, a third compressed mode request that requests from the management server a third time slot within the predetermined period in which the third UE can enter compressed mode, wherein the third UE is associated with at least one of the first cell and the second cell; and
   in response to the third compressed mode request, determine the third time slot based on at least one of the first time slot and the second time slot.

4. The management server of claim 3, wherein the third UE is associated with the first cell, and wherein the third time slot is determined by adding to the first time slot a number of frames based on dividing the predetermined period into a number of sub-periods of equivalent length.

5. The management server of claim 3, wherein the third UE is associated with the first cell, and wherein the third time slot is determined so as to maximize a distance in time between the first time slot and the third time slot within the predetermined period.

6. The management server of claim 1, wherein the second time slot is determined based on: (i) a number of cells under management by the management server and (ii) a maximum number of UEs, within one cell, that can be permitted to go into compressed mode within one predetermined period.

7. The management server of claim 1, wherein the predetermined period consists of at least one of 24 frames and 32 frames.

8. A method for scheduling compressed mode time slots for a plurality of user equipments (UEs) associated with a plurality of cells, the method comprising:
   receiving, at a management server and from a first UE, a first compressed mode that requests from the management server a first time slot within a predetermined period in which the first UE can enter compressed mode, wherein the first UE is associated with a first cell being served by a first base station;
   receiving, at the management server and from a second UE, a second compressed mode request that requests from the management server a second time slot within the predetermined period in which the second UE can enter compressed mode, wherein the second UE is associated with a second cell being served by a second base station;
   determining, at the management server, in response to the first compressed mode request, the first time slot; and
   determining, at the management server, in response to the second compressed mode request, the second time slot based on the first time slot, wherein the second time slot is determined based on dividing a number of frames in the predetermined period by a number of cells under management by the management server.

9. The method of claim 8, wherein the first cell and the second cell are at least one of small cells and macrocells.

10. The method of claim 8, further comprising:
    receiving, at the management server and from a third UE, a third compressed mode request that requests from the management server a third time slot within the predetermined period in which the third UE can enter compressed mode, wherein the third UE is associated with at least one of the first cell and the second cell; and
    determining, at the management server, in response to the third compressed mode request, the third time slot based on at least one of the first time slot and the second time slot.

11. The method of claim 10, wherein the third UE is associated with the first cell, and wherein determining the third time slot comprises adding to the first time slot a number of frames based on dividing the predetermined period into a number of sub-periods of equivalent length.

12. The method of claim 10, wherein the third UE is associated with the first cell, and wherein determining the third time slot comprises maximizing a distance in time between the first time slot and the third time slot within the predetermined period.

13. The method of claim 8, wherein the second time slot is determined based on: (i) a number of cells under management by the management server and (ii) a maximum number of UEs, within one cell, that can be permitted to go into compressed mode within one predetermined period.

14. The method of claim 8, wherein the predetermined period consists of at least one of 24 frames and 32 frames.

15. A system for decreasing interference in a wireless network, comprising:
- a first base station associated with a first cell to communicate via a wireless link with at least a first user equipment (UE);
- wherein the first base station is to determine a first time slot within a predetermined period in which the first UE can enter compressed mode, wherein the first time slot is determined based on a second time slot within the predetermined period in which a second UE can enter compressed mode, wherein the second time slot is determined by a second base station associated with a second cell to communicate via a wireless link with the second UE; and
- a management server to send information regarding the second base station to the first base station, and to send information regarding the first base station to the second base station;
- wherein the first base station is to determine the first time slot based on the information received from the management server regarding the second base station;
- wherein the second base station is to determine the second time slot based on the information received from the management server regarding the first base station;
- wherein the first base station is to determine the first time slot based on dividing a number of frames in the predetermined period by a number of cells under management by the management server.

16. The system of claim 15, wherein the first cell and the second cell are at least one of small cells and macrocells.

17. The system of claim 15, wherein the first base station is further to communicate with a third UE associated with the first cell, and to determine a third time slot within the predetermined period in which the third UE can enter compressed mode, wherein the third time slot is determined based on at least one of the first time slot and the second time slot.

18. The system of claim 17, wherein the third time slot is determined so as to maximize a distance in time between the first time slot and the third time slot within the predetermined period.

19. The system of claim 15, wherein the first base station is to determine the first time slot based on: (i) a number of cells under management by the management server, and (ii) a maximum number of UEs, within one cell, that can be permitted to go into compressed mode within one predetermined period.

20. A method for decreasing interference in a wireless network, comprising:
- determining, at a first base station associated with a first cell, a first time slot within a predetermined period in which a first user equipment (UE) associated with the first cell can enter compressed mode, wherein the first time slot is determined based on a second time slot within the predetermined period in which a second user equipment (UE) associated with a second cell can enter compressed mode, wherein the second time slot is determined at a second base station associated with the second cell;
- sending, from a management server, information regarding the second base station to the first base station;
- sending, from the management server, information regarding the first base station to the second base station;
- wherein the first time slot is determined based on the information received from the management server regarding the second base station; and
- wherein the second time slot is determined based on the information received from the management server regarding the first base station;
- wherein the first time slot is determined based on dividing a number of frames in the predetermined period by a number of cells under management by the management server.

21. The method of claim 20, wherein the first cell and the second cell are at least one of small cells and macrocells.

22. The method of claim 20, further comprising determining, at the first base station, a third time slot within the predetermined period in which a third user equipment (UE) associated with the first cell can enter compressed mode, wherein the third time slot is determined based on at least one of the first time slot and the second time slot.

23. The method of claim 22, wherein the third time slot is determined so as to maximize a distance in time between the first time slot and the third time slot within the predetermined period.

24. The method of claim 20, wherein the first time slot is determined based on: (i) a number of cells under management by the management server and (ii) a maximum number of UEs, within one cell, that can be permitted to go into compressed mode within one predetermined period.

* * * * *

UNITED STATES PATENT AND TRADEMARK OFFICE
CERTIFICATE OF CORRECTION

PATENT NO. : 9,826,527 B2
APPLICATION NO. : 14/529534
DATED : November 21, 2017
INVENTOR(S) : Sushanth Chandappa Kulal It is certified that error appears in the above-identified patent and that said Letters Patent is hereby corrected as shown below:

In the Specification

In Column 9, Line 25, delete "$P_{mod} \ N_{cell}$" and insert -- $P_{mod}/N_{cell}$ --, therefor.

In Column 9, Line 26, delete "$2 \cdot P_{mod} \ N_{cell}$" and insert -- $2 \cdot P_{mod}/N_{cell}$ --, therefor.

In the Claims

In Column 24, Line 3, in Claim 19, delete "server," and insert -- server --, therefor.

Signed and Sealed this
Thirteenth Day of March, 2018

Andrei Iancu
*Director of the United States Patent and Trademark Office*